United States Patent [19]
Hayes et al.

[11] Patent Number: 5,148,965
[45] Date of Patent: Sep. 22, 1992

[54] METHOD OF SHEAR FORGE BONDING AND PRODUCTS PRODUCED THEREBY

[75] Inventors: Arthur F. Hayes, Greendale; Joseph A. Lemsky, St. Francis, both of Wis.

[73] Assignee: Ladish Co., Inc., Cudahy, Wis.

[21] Appl. No.: 565,259

[22] Filed: Aug. 9, 1990

[51] Int. Cl.$^5$ .................. B23K 20/02; B23K 28/02
[52] U.S. Cl. .................... 228/115; 228/116; 228/171; 228/170; 29/889; 29/522.1; 409/310
[58] Field of Search .............. 228/115, 170, 171, 165, 228/116, 265; 72/DIG. 700; 29/889, 522.1, 445; 83/13, 914; 409/293, 309, 310

[56] References Cited

U.S. PATENT DOCUMENTS

| | | | |
|---|---|---|---|
| 4,002,284 | 1/1977 | Suppus | 228/115 |
| 4,015,765 | 4/1977 | Ahmed | 29/522.1 |
| 4,305,198 | 12/1981 | Kanamaru et al. | 29/522.1 |
| 4,699,309 | 10/1987 | Atsuta et al. | 228/116 |
| 4,843,856 | 7/1989 | Bhowal et al. | 72/700 |

FOREIGN PATENT DOCUMENTS

WO88/00872 2/1988 PCT Int'l Appl.

OTHER PUBLICATIONS

The Welding Journal, "New Forge Welding . . . ", Cook, Shafer, Apr. 1958, pp. 348-358.
"Cut Welding", De Chiffre, L., Sep. 1988.

Primary Examiner—Richard K. Seidel
Assistant Examiner—Jeanne M. Elpel
Attorney, Agent, or Firm—Foley & Lardner

[57] ABSTRACT

A method for shear forge bonding two or more metal parts having forging compatible compositions is comprised of the steps of sizing parts to be joined across a forged bond line, disposing those parts in forging dies configured to present them in a bonding-effective orientation, shearing surfaces, one on each of the metal parts, located proximately and opposite one another across a gap, under controlled conditions of temperature and atmosphere selected to prevent the formation of any bonding disruptive surface contamination on the sheared surfaces, and then finally forging those parts to close the gap and bring the sheared surfaces into contact under controlled conditions of temperature, pressure, atmosphere, and outer diameter constraint to yield a shear forged bond between the sheared surfaces.

17 Claims, 3 Drawing Sheets

METHOD OF SHEAR FORGE BONDING AND PRODUCTS PRODUCED THEREBY

BACKGROUND OF THE INVENTION

1. Technical Field

The present invention relates generally to the bonding or joining of metals. More particularly, the invention relates to joining metal parts by shear forge bonding, under controlled heat, atmosphere and pressure to promote high integrity metallic bonding of similar or dissimilar metals, but especially superalloys for dual alloy disks.

2. Background of the Invention

Ideally, if two perfectly clean and perfectly smooth metal surfaces are placed in contact with one another, a perfect metallic bond will result which will be indistinquishable from the native metal surrounding it. However, metal and metal alloy surfaces in normal atmospheric environments are always covered with bonding disruptive contamination, such as films of oxides, nitrides, and/or adsorbed gases, which prevent sufficient intimacy of contact to achieve metallic bonding.

Processes have been developed to eliminate surface films and establish the necessary intimacy of contact between metal parts. An example is fusion welding, which effectively disrupts surface films by dissolution and/or melting and establishes the necessary intimacy of contact by wetting in the molten phase. The problem with fusion welding is that the fused weld joint is very distinct from the wrought microstructure surrounding it, potentially adversely affecting the mechanical properties of the metal(s) at the joint or requiring post-joining treatments to ameliorate those adverse effects. Brazing and soldering are also examples of joining processes which disrupt surface films by dissolution or melting of surface contaminants; they establish the necessary joint by bridging components with filler material which forms intimate contact by wetting the molten phase on respective surfaces of the component parts. These lower temperature processes present less severe adverse consequences, but are also of more limited engineering application.

Another process for joining metals is diffusion bonding, where cleaned metal surfaces are bonded under high temperature and pressure in a vacuum or other benign environment. This type of bonding has been successful for some metal systems, such as titanium, iron or copper, which dissolve all or most of their usual surface contaminants. However, aluminum or superalloys which form tenacious surface oxides that do not dissolve or diffuse into the parent alloy require special processing, such as coating the surface to be bonded with boron or another joining adjuvant. Such a coating will clean surface oxides and dissolve into a film of molten metal during high temperature diffusion bonding, but can cause property debits in the joint.

Inertia or friction welding is a solid state welding process which uses heat of friction developed between rotating and stationary workpiece components to produce a metallic bond. Contaminants on the mating surfaces are dissolved, attrited and/or displaced with deformed surface metal beyond the final joint geometry. The equipment required is generally sophisticated, expensive, and amenable primarily to face-to-face joints.

It is desirable in metal bonding processes to clean the surfaces to be bonded of all contaminants and to maintain the surface integrity until the surfaces can be brought into intimate contact to achieve metallic bonding. Another desirable feature for many bonding processes is to bond the metal surfaces at forging or solution temperatures rather than ultra-high temperatures (i.e., temperatures above alloy solvus temperature). The above and other features are addressed by various aspects of the invention described below.

SUMMARY OF THE INVENTION

The present invention advantageously provides a method for shear forge bonding two or more metallic parts into a unitary structure in which the parts are joined across a solid state bond line. The process of the present invention achieves metallic bonding to yield a metal part formed from either identical or similar and suitably compatible metallic compositions. When dissimilar but compatible materials are joined in accordance with the process of the present invention, mechanical properties may be tailored to be different across an abrupt bond line which maintains the characteristics of each of the parent components, unlike a fusion process which blends parent metal into a unique bond or joint.

Shear forge bonding in accordance with the present invention accordingly enjoys the advantage of yielding a bonding procedure which does not require filler metal and which does not contribute to a joint which differs from the native materials from which the parts are formed. By judicious selection of appropriate compositions, a metallic bond can be achieved which has native or approximately native strength as compared with the materials from which the part is formed. This approach offers special advantages in joining superalloy compositions in the manufacture of turbine components where differential mechanical properties between the rim and bore are highly desirable.

The foregoing, and other advantages of the present invention, are realized in one aspect thereof through a process for shear forge bonding two or more metal parts having forging compatible compositions, comprising the steps of first sizing the metal parts to be joined across a solid state bond line, thence disposing them in forging dies configured to present those parts in a bonding-effective orientation; subsequently and concurrently shearing first and second surfaces on the metal parts, one of each located proximately and opposite the other across a narrow gap, under controlled conditions of temperature and atmosphere which have been selected to prevent the formation of any bonding disruptive surface contamination on the sheared surfaces; and finally, forging those parts to close the gap and bring the sheared surfaces into contact under controlled conditions of temperature, pressure and atmosphere to yield a solid state bond between them. The shearing step is conducted to yield a smooth surface of native metal, while the forging step brings opposed surfaces together in that condition so that, under forging-effective temperatures and pressures, the surfaces join through a true metallic bond.

In a particularly preferred environment, a cutter ring is in contact with workpiece parts and disposed in operative association with each of the forging dies so that the shearing step is conducted as those dies are moved relative to one another. In this preferred implementation, the forging step which follows is most preferably an upset forging step.

Other advantages and a fuller appreciation for the metes and bounds of the present invention will be better understood with reference to the detailed description of the invention, taken in conjunction with the figures of drawing.

DETAILED DESCRIPTION OF PREFERRED EMBODIMENT

Figure 1:
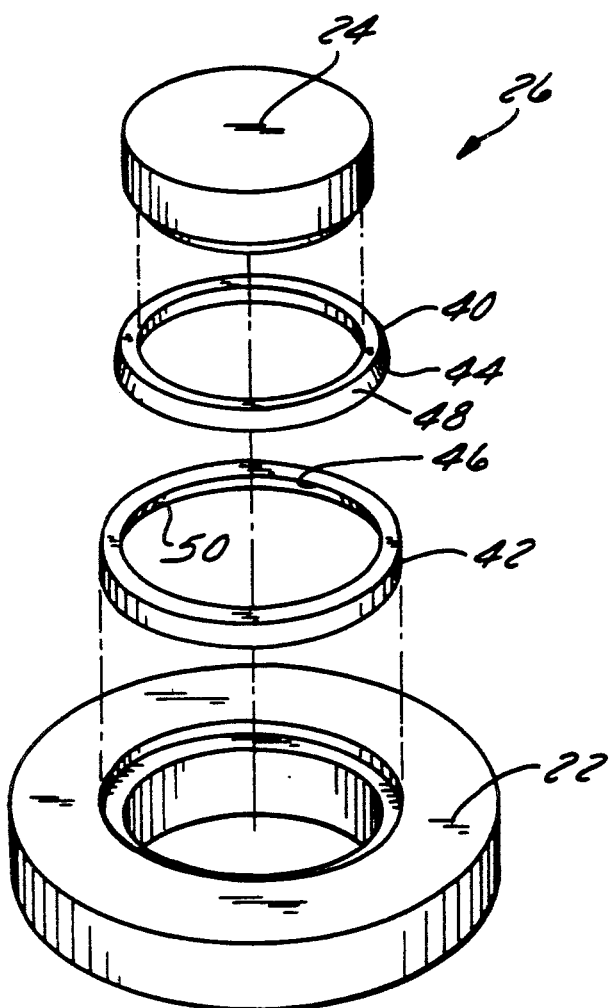
FIGS. 1 and 2 are perspective views of the individual component parts of a shear bonded assembly and the assembly itself, prior to bonding.
Figure 2:
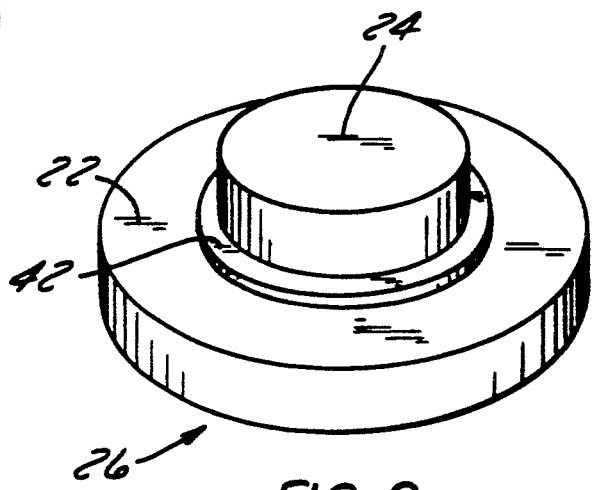

In many manufacturing applications it is desirable to have dual alloy disks which use different metals at the rim and the bore. This allows the designer to tailor disks to provide specific mechanical property requirements at each location within the disk. An example of the advantages of dual alloy disks is seen in the manufacture of turbine engines demanding high strength in the bore section of the turbine and high creep resistance at the rim of the disk.

A further objective in the making of dual alloy disks is to find a suitable method for joining dissimilar metals, without sacrificing material properties at the bond joint. Fusion welded joints or brazed joints for instance can sacrifice bond strength, change the material composition at the bond line, or increase the weight of the disk. The shear forge bonding process of the present invention has been developed to facilitate the joining of dissimilar metals or structures without sacrificing the bond strength and without introducing a new composition or structure to the disk.

The instant process is predicated on shear forge bonding, and bonds metal parts of similar or dissimilar compositions without adding material or heating the joint to a temperature higher than normal processing (forging or heat treatment) temperatures. Shear forge bonding establishes a metallic bond between the metal parts by forging a clean metal surface of one into intimate contact with a clean metal surface of the other. When two perfectly clean and perfectly matched metallic surfaces are placed in contact with one another in accordance with the present invention, a metallic bond results effectively indistinguishable from the metal surrounding it.

Shear forge bonding, as the term is used herein, is the bonding of two metals by cleaning each metal surface via a shearing action and pressing their cleaned surfaces together under sufficient pressure and temperature to ensure metallic bonding. With shear forge bonding, it is necessary to remove a surface layer of metal from each part and maintain the sheared surfaces in a benign environment, which precludes the formation of any bonding disruptive or bonding preventative surface contaminants, until intimate contact of the surfaces takes place and bonding occurs. Thus, it is necessary to avoid the formation of films of oxides, nitrides and adsorbed gases which cover metal and metal alloy surfaces in normal atmospheric environments. Any such film can prevent sufficient intimacy of contact between the metal surfaces even under high temperature and pressure. The present bonding process therefore is designed to eliminate surface films and establish the necessary intimacy of contact to effect the metallic bond under these shear forge bonding conditions.

In accordance with the present invention, the method provides for cleaning mating surfaces of all contaminants and maintaining the surface integrity until a joining-effective amount of deformation brings the surfaces into intimate contact to create a metallic bond. The method is not limited to high temperatures and can normally be accomplished at forging or solution temperatures.

The method of the present invention preferably comprises simultaneously shearing surface metal from the surfaces of two metal parts or sections to be joined along the bond or mating line. The most preferred method is specifically designed to bond an outer ring section of a disk to the hub or inner section of a disk, such that the bond line is parallel to the rotational axis of the disk. The process can be used for similar as well as dissimilar metals although it is particularly well suited to dual alloy or dual property disk fabrication.

Each of the metal parts must be sized to be appropriately joined. For instance, when bonding the outer ring section of the disk to the hub of the disk, the inside diameter of the ring and the outside diameter of the hub must be appropriately sized. Sizing would require the selection of appropriate inside and outside diameters so that when the surface metal is sheared from each part and the parts are moved into a position to be bonded, only a small bond line gap exists between the surfaces to be bonded. The bond line gap must be sufficiently narrow to promote uniform intimate contact of the mating surfaces with a minimum of upset forging.

The preferred implementation of the present method advantageously uses a set of dies to hold the metal sections to be joined. Typically the outer ring of the disk to be formed lies in the bottom die while the hub of the disk is held against the top die. The dies are configured so that the parts to be bonded are oriented in a bonding-effective position when the dies are pressed together. Two cutter rings made from a high temperature, high strength material are desirably positioned to engage the surfaces to be sheared. The materials used to make the cutter rings include TZM molybdenum (titanium, zirconium, molybdenum alloy), HCM molybdenum (hafnium carbide, molybdenum alloy), or ZHM molybdenum (hafnium carbide, zirconium, molybdenum alloy).

To obtain the shear bond between the hub and the outer ring, surface metal must be sheared from the outer diameter surface of the hub and the inner diameter surface of the ring. The sheared surface material collects in die cavities located in each die. To achieve this, the outer cutter ring and inner cutter ring simultaneously shear surface metal from the hub and outer ring as the hub and outer ring are pressed together between the dies. By maintaining contact between the cutter rings and the surfaces being sheared, a vacuum can be maintained between the cutter rings and the region where the sheared metal surfaces exist; i.e., contact of the cutters with the shearing metal can maintain a (vacuum) seal along the bond line as shearing proceeds (albeit, depending on process conditions and materials, the vacuum need be only slightly subatmospheric to be effective). It may be beneficial to perform the process in the environment of an engineering vacuum to reduce external gas pressure on the vacuum seal and thus aid in maintaining such a bond line vacuum. When molybdenum alloy cutter rings are used, a vacuum or protective environment is necessary to prevent oxidation of the molybdenum material.

The cutters and tolerances are preferably calculated to ensure a slight gap between the parts to be bonded once the shearing of surface metal is complete. This protects against premature partial bonding and consequent distortion of the bond line surface as the hub and outer ring are pressed together between the dies. A load commensurate with the flow stresses of the materials being bonded is applied to the disk sections forcing the hub and outer ring material to close the bond line gap and contact each other forming an intimate metallic bond. This slight amount of upset forging is also necessary to compensate for potential discrepancies in surface shape or smoothness between the mating sheared surfaces. The upset forging is conducted under controlled conditions of temperature, pressure, atmosphere and peripheral constraint to yield a shear forge bond. Consequently, insofar as shearing and forging are required to complete the bond, metals having forging compatible compositions are preferably used in the shear forge bonding process. "Forging compatible" compositions are those compositions which have similar flow stresses at the temperatures and strain rates to be used in the shear forge bonding process and which exhibit sufficiently compatible microstructure to permit the solid state joint to form.

Certain types of metals are more amenable to the shear forge bonding method of the present invention. Examples of materials that have been successfully shear bonded are "Rene '95" to "Rene '95", "Rene '95"to "Rene '88DT", "Rene '95"to "AF2-1DA", "Rene '88"to "INCO 718", "Rene '88"to "Rene '95", and "Astroloy" to "IN100". These alloys are nickel-based superalloys. "Rene '95"has a nominal composition of Ni (61%), Cr (14.9%), Co (8.0%), Mo (3.5%), Cb (3.5%), Al (3.5%), Ti (2.5%), C (0.15%), B (0.10%), Zr (0.05%). "Af32-1DA" has a nominal composition of Ni (59%), Cr (12.0%), Co (10.0%), Mo (3.0%), W (6.0%), Ta (1.5%), Al (4.6%), Ti (3.0%), Fe (1.0% max.), C (0.35%), B (0.014%), Zr (0.10%). "Astroloy" has a nominal composition of Ni 55%), Cr (15.0%), Co (17.0%), Mo (5.3%), Al (4.0%), Ti (3.5%), C (0.6%), B (0.030%). "IN-100" has a nominal composition of Ni (60%), Cr (10.0%), Co (15.0), Mo (3.0%), Al (5.5%), Ti (4.7%), C (0.18%), B (0.014%), Zr (0.06%). These materials can be sheared according to the method of the invention at temperature ranging from 1,800° F. to 2,100° F.

It is apparent from testing that the shear forge bonding process is more adaptable to combining/bonding certain materials. Alloys of significantly different compressive strengths and/or shear strengths may not be amenable to the shear forge bonding process. Similarly, the shear strengths of workpiece materials must be significantly lower than the shear strengths of the cutter materials at temperature of operation. As used herein, the terms "forging compatible" and "bonding effective" are thus meant to connote those conditions conducive to the formation of metallic bonds between the parts to be joined by the shear forge bonding technique disclosed herein, and to exclude those compositions which are unable to achieve adequate engineering integrity for the task or purpose to which the joined parts are intended to be put. Insofar as different engineering applications will implicate different, and perhaps widely different, physical, mechanical and chemical requirements, it is not possible to qualify these parameters; thus, the same are expressed functionally in this specification with the understanding that those skilled in the art will be able to determine these matters without the need for undue experimentation, guided by the principles set forth herein.

Further along the foregoing lines, selection of materials to be bonded requires attention to various parameters of each material. For instance, the coefficients of thermal expansion for each material should be similar. If the coefficients of thermal expansion are substantially different, undesirable post bond residual stresses may result. Likewise, if any phase forms through interface reaction at the bond line, it should also be compatible with each of the materials selected for shear forge bonding to avoid undesirable qualities at the bond line, such as brittleness.

Referring now to the Figures of Drawing, the shear forge bonding method of the present invention is illustrated with specific reference to a shear bond apparatus 20, designed to bond an outer ring section 22 of a disk 26 to a hub 24 or inner section of a disk 26, such that a bond line 28 is parallel to the axis of the disk. The shear forge bonding method comprises the simultaneous shearing of surface metal from the mating surfaces of hub 24 and outer ring 22.

In the process, a top die 30 and a bottom die 32 are used. Outer ring 22 rests on bottom die 32 and hub 24 is held between outer ring 22 and top die 30. Bottom die 32 contains a first die cavity 34, while top die 30 contains a second die cavity 36, each of the die cavities being complementary in shape to the part to be received in the bonding process. Both die cavities 34 and 36 allow for the escape of surface metal 38 when hub 24 and outer ring 22 are pressed together during the bonding process.

Figure 4:
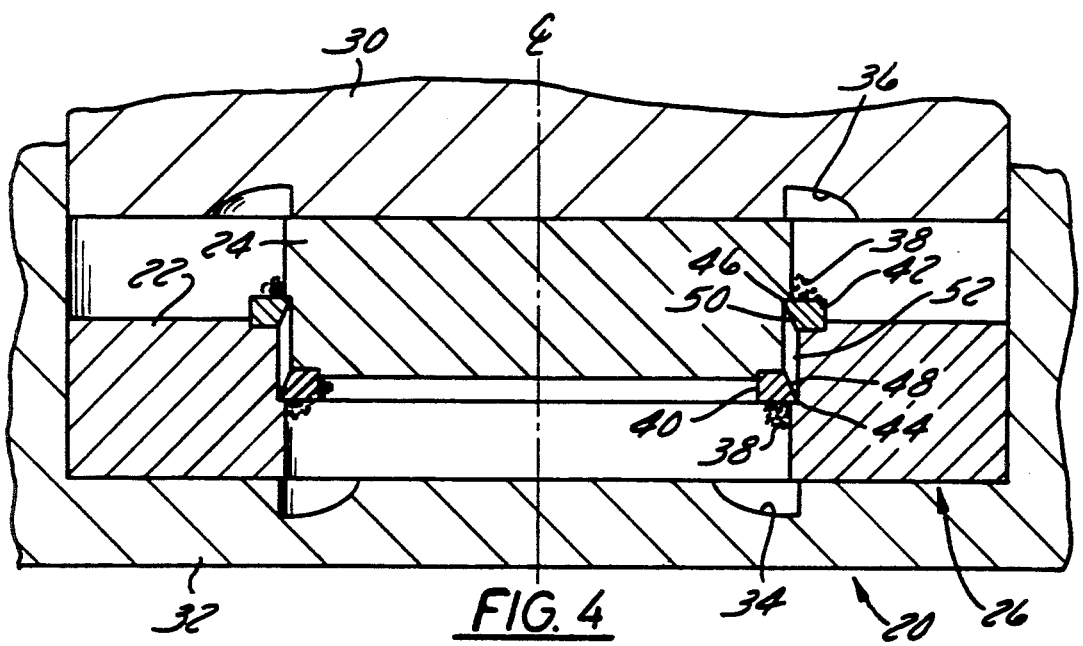
FIG. 4 is a view, similar to FIG. 3, during the process in accordance with the present invention, at which point surfaces appropriate for shear forge bonding are in the process of being formed.

An inner cutting ring 40, extending along the circumference of hub 24, is held in place at the bottom of hub 24, and an outer cutting ring 42, extending along the inside diameter of outer ring 22, is held in place at the top of outer ring 22. The two cutter rings are made from a high temperature, high strength material, such as TZM molybdenum, and are positioned to engage the surfaces to be sheared. As best viewed in FIG. 4, the lower outside diameter cutting edge 44 of inner cutting ring 40 will shear surface metal 38 from the inside diameter of outer ring 22 of disk assembly 26. Concurrent with this, an upper inside diameter cutting edge 46 of outer cutting ring 42 will shear surface metal 38 from the outside diameter of hub 24 of the disk assembly. Contact of the cutters with the shearing metal maintains a vacuum seal along bond line 28 as shearing proceeds. As hub 24 is pressed into the center of outer ring 22, inner cutting ring 40 and outer cutting ring 42 maintain intimate contact with the surfaces being sheared thus preventing any gas from contacting the freshly sheared surfaces. Practically, this aspect of the process may be best performed in a benign atmosphere or one potentially beneficial to the objectives of the process, for example, in a vacuum.

Figure 3:
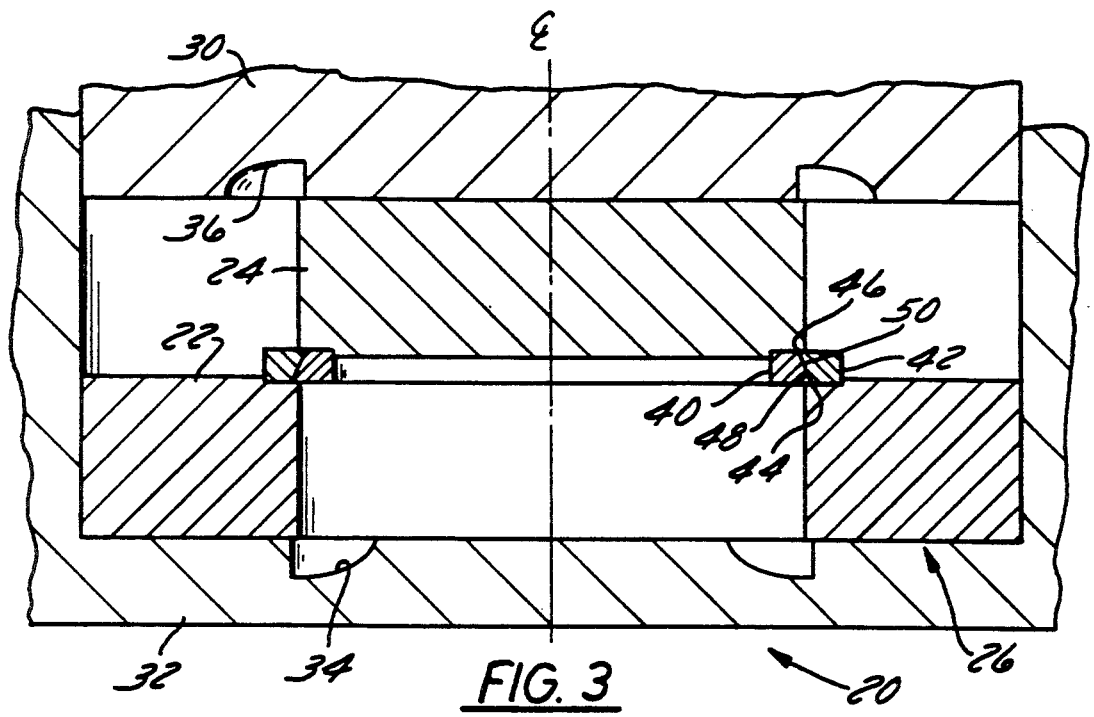
FIG. 3 is a side elevation view, in schematic form, of upper and lower forging dies prior to the initiation of a shear forge bonding procedure in accordance with the present invention.

In order to achieve the proper shear, hub 24 and outer ring 22 as well as cutter rings 40 and 42 should be accurately aligned. Cutter rings 40 and 42 can be located and held in place through the use of a register or counterbore on hub 24 as shown in FIG. 3. Hub 24 and outer ring 22 can be aligned by a number of methods obvious to those familiar with the art of aligning tool assemblies. Such methods include the use of an expendable locator or a system of tooling registers. Since cutter rings 40 and 42 are located through the use of a register on hub 24, alignment of hub 24 and outer ring 22 by any of the above methods will place the entire system in alignment.

Alignment method and workpiece dimensions are dependent upon the coefficients of thermal expansion of workpiece materials and cutter material. Room temperature clearances must be commensurate with the expansion differences of the various materials at the bonding temperature selected. For example, with a superalloy workpiece and TZM molybdenum cutting ring system the hub register would expand to make contact with the inside diameter of inner cutting ring 40 which in turn locates outer cutting ring 42. Those skilled in this art will know how to make proper allowances for (differential) thermal expansion.

Figure 5:
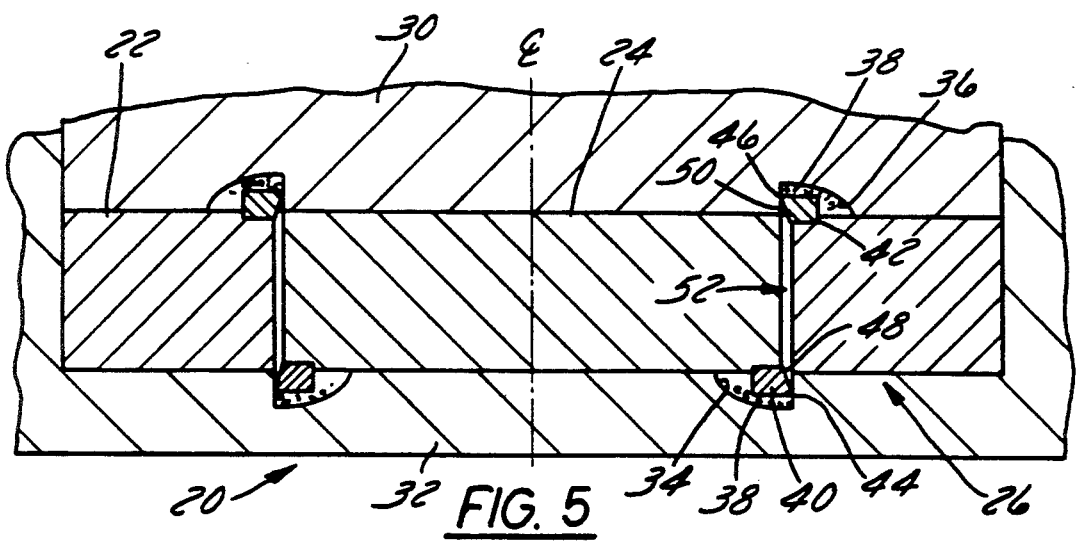
FIG. 5 is a view, similar to the foregoing, following the completion of the shearing step of the present invention, in which native surfaces are formed proximately and opposite one another across a gap.
Figure 6:
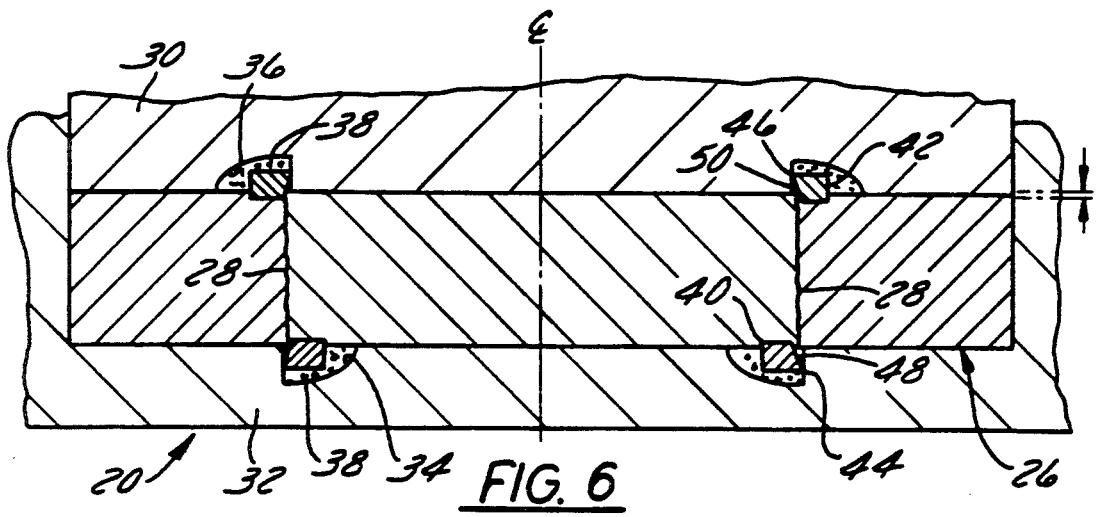
FIG. 6 is a view, similar to the foregoing, illustrating the forging step of the instant method.
Figure 7:
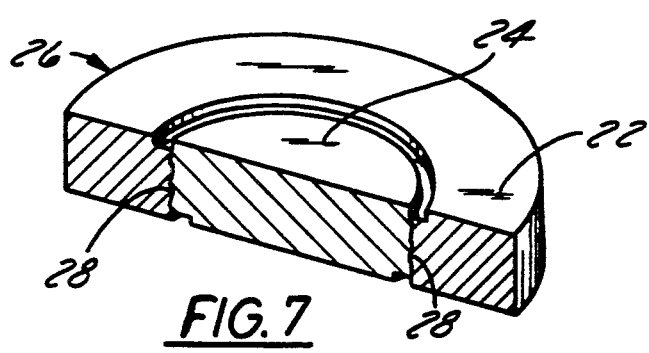
FIG. 7 is a perspective view of a part made in accordance with the shear forge bonding method of the present invention.

Top die 30 and bottom die 32 are pressed together until inner cutting ring 40 and outer cutting ring 42 have sheared across the inside diameter surface of outer ring 22 and the outside diameter surface of hub 24, respectively, as shown in FIG. 5. Die cavities 34 and 36 are large enough to receive sheared surface metal 38. It is preferred that this cavity also receive cutting rings 40 and 42 respectively. This conserves workpiece metal provided that the cutter seal is maintained throughout the shearing process through use of adequate clearance between cutter rings 40 and 42 and die cavities 34 and 36.

As a safeguard against premature bonding of the sheared surfaces, it is most preferred that the cutting rings each have a taper of approximately one degree. Inner cutting ring 40 has a ring taper 48, located on its outside diameter, which tapers downwardly and outwardly while outer cutting ring 42 has a ring taper 50, located on its inside diameter, opposite to ring taper 48 (FIG. 1). Outer cutting ring 42 is tapered to engage the taper of inner cutting ring 40 (FIG. 3).

As hub 24 and outer ring 22 are pressed together by top die 30 and bottom die 32, cutting ring 40 and cutting ring 42 shear surface metal from the outer ring 22 and hub 24, respectively. A bond line gap 52 is left between hub 24 and outer ring 22. This bond line gap 52 is approximately 0.010 inches to 0.020 inches wide. The clean mating surfaces of hub 24 and outer ring 22 are then brought together by applying a load to the top and bottom of the disk sections (i.e., hub 24 and outer ring 22) commensurate with the materials being bonded. Usually, only a slight amount of upset forging is required to close the bond line gap 52. Therefore, it is necessary that top die 30 and bottom die 32 have the capability of transmitting sufficient pressure to deform the workpiece after shearing to assure a uniform, intimate contact between bonding surfaces. The upset forging completes the bond and compensates for minor separations due to imperfect surface smoothness.

The resulting disk assembly 26 exhibits a metallic bond along bond line 28. This metallic bond can be formed between a hub and an outer ring of similar or dissimilar bonding compatible metals, as long as the clean surfaces of one metal part are brought into intimate contact with the clean surfaces of the other metal part.

The method of shear forge bonding and the resulting bonded disk assembly can be illustrated by the following example:

EXAMPLE

A hub consisting of "AF2-1DA6" superalloy and an outer ring of "Rene '95" superalloy were successfully shear bonded using an apparatus like that shown in the figures. The cutter rings used were TZM molybdenum. The hub outside diameter was 2.028 inches and the ring inside diameter was 1.942 inches. A shear of 0.018 inch per cutting edge was allowed. The process was conducted at a temperature of 2,025° F., a velocity of one inch per minute, and a dwell lasting for 30 seconds at a forging pressure of 30 ksi. Upon completion of the shear bond process, a complete, intimate bond was revealed microscopically and substantiated mechanically through tensile tests. Failure of tensile specimens did not occur at the bond.

While the invention has now been described in terms of certain preferred embodiments, and exemplified with respect thereto, those skilled in the art will appreciate the various substitutions, changes, omissions and modifications may be made without departing from the spirit thereof. For example, while it is normally desired to create as strong an intimate bond between components as is possible, there are circumstances under which "weak" bonding may be as or more desirable. One such instance involves applications where a part in a machine or device is designed to break at a pre-set stress level to protect other parts which are more costly to replace or repair. The shear forge bonding process of the present invention permits those skilled in the art to tailor these weaker joints as well as the usually more desirable higher strength bonds typical of, e.g., turbine disks. Thus, given the range of variability of the present invention, it is intended that it be limited solely by proper interpretation of the appended claims.

We claim:

1. A method for shear forge bonding first and second metal parts having forging compatible compositions, comprising the steps of:
    a. sizing first and second metal parts for joining across a shear forged bond line;
    b. disposing said metal parts in forging dies configured to present said parts in a bonding-effective orientation;
    c. shearing first and second surfaces, one on each of said metal parts, located proximately and opposite one another across an open gap, said gap having a width sufficient to prevent premature partial bonding of said surfaces, under controlled conditions of temperature and atmosphere selected to prevent the formation of any bonding disruptive surface contamination on the sheared surfaces; and
    d. forging said parts to close said gap and bring said sheared surfaces into contact, under controlled conditions of temperature, pressure, atmosphere and peripheral constraint, to yield autogenous bond therebetween.

2. The method of claim 1, wherein said gap is from 0.010 inches to 0.020 inches.

3. A method for shear forge bonding first and second metal parts having forging compatible compositions, comprising the steps of:

a. sizing first and second metal parts for joining across a shear forged bond line;

b. disposing said metal parts in forging dies configured to prevent said parts in a bonding-effective orientation;

c. shearing first and second surfaces, one on each of said metal parts, located proximately and opposite one another across a gap, under controlled conditions of temperature and atmosphere selected to prevent the formation of any bonding disruptive surface contamination on the sheared surfaces;

d. forging said parts to close said gap and bring said sheared surfaces into contact, under controlled conditions of temperature, pressure, atmosphere and peripheral constraint, to yield an autogenous bond therebetween;

wherein said disposing step comprising disposing said first metal part in contact with a first forging die and said second metal part in contact with a second forging die, each of said dies having an area of generally complementary configuration respecting the part received therein; and further wherein each of said metal parts is fitted with a cutter ring for shearing a surface on the part disposed in contact with the other die.

4. The method of claim 3, wherein said shearing step is comprised of the relative movement of said first and second forging dies under sufficient pressure to remove a predicted portion of the surface of each of said metal parts to prepare said first and second joining surfaces.

5. The method of claim 4, wherein the shearing step is conducted in an engineering vacuum environment.

6. The method of claim 4, wherein said shearing step is conducted within the range of temperatures from 1,800° F. to 2,100° F.

7. The method of claim 4, wherein said forging step is an upset forging step to join said first and second parts.

8. The method of claim 7, wherein said first part is a turbine disk hub and said second part is a turbine disk outer ring.

9. The method of claim 3, wherein each of said first and second dies includes a secondary die cavity for receiving sheared material forged during said shearing step.

10. The method of claim 3, wherein said cutter ring is formed from a material selected from the group consisting of TZM molybdenum, HCM molybdenum, and ZHM molybdenum.

11. A method for shear forge bonding first and second metal parts having forging compatible compositions, comprising the steps of:

a. sizing first and second metal parts for joining across a shear forged bond line;

b. disposing said metal parts in a bonding-effective orientation;

c. shearing first and second surfaces, one on each of said metal parts, located proximately and opposite one another across a gap, under controlled conditions of temperature and atmosphere selected to prevent the formation of any bonding disruptive surface contamination on the sheared surfaces;

d. forging said parts to close said gap and bring said sheared surfaces into contact, under controlled conditions of temperature, pressure, atmosphere and peripheral constraint, to yield an autogenous bond therebetween;

wherein said first and second metal parts comprise nickel-based superalloys.

12. The method of claim 11, wherein the shearing step is conducted in an engineering vacuum environment.

13. The method of claim 11, wherein the shearing step is conducted within the range of temperatures from 1,800° F. to 2,100° F.

14. The method of claim 11, wherein said nickel-based superalloys contain Cr, Co, Mo, Al, and Ti.

15. A method for shear forge bonding first and second metal parts having forging compatible compositions, comprising the steps of:

shearing first and second surfaces, one on each of said metal parts, with a pair of cutters, said surfaces being positioned proximate to and opposite one another, and spaced from each other across an open gap by a distance effective to prevent premature partial bonding, wherein said cutters are disposed in opposing positions such that relative movement between said cutters during shearing forms a vacuum sealed space along a bond line between said surfaces, which space includes said gap, and said shearing step is conducted under controlled conditions of temperature and atmosphere selected to prevent the formations of any bonding disruptive surface contamination of the sheared surfaces; and forging said parts together by closing said gap and bringing said sheared surfaces into mutual contact along said bond line under controlled conditions effective to yield a bond therebetween.

16. The method of claim 15, wherein the shearing step is conducted within the range of temperature from 1,000° F. to 2,100° F.

17. The method of claim 15, wherein said first and second metal parts comprise a hub and an outer ring section.

* * * * *